April 11, 1950 S. M. RODHE 2,504,050

TRANSMITTER WITH FREQUENCY MODULATION

Filed May 27, 1948 5 Sheets-Sheet 1

INVENTOR
SVEN MAGNUS RODHE,

BY Leech & Radue
ATTORNEYS

INVENTOR
SVEN MAGNUS RODHE
BY Leach & Radue
ATTORNEYS

April 11, 1950 S. M. RODHE 2,504,050

TRANSMITTER WITH FREQUENCY MODULATION

Filed May 27, 1948 5 Sheets-Sheet 3

INVENTOR
SVEN MAGNUS RODHE

BY Leach & Radue

ATTORNEYS

TRANSMITTER WITH FREQUENCY MODULATION

Filed May 27, 1948 5 Sheets-Sheet 4

INVENTOR
SVEN MAGNUS RODHE

BY Leech & Radue

ATTORNEYS

April 11, 1950 S. M. RODHE 2,504,050

TRANSMITTER WITH FREQUENCY MODULATION

Filed May 27, 1948 5 Sheets-Sheet 5

INVENTOR
SVEN MAGNUS RODHE

BY Leach & Radue

ATTORNEYS

Patented Apr. 11, 1950

2,504,050

UNITED STATES PATENT OFFICE 2,504,050

TRANSMITTER WITH FREQUENCY MODULATION

Sven Magnus Rodhe, Stockholm, Sweden, assignor to Telefonaktiebolaget L M Ericsson, Stockholm, Sweden, a company of Sweden Application May 27, 1948, Serial No. 29,591
In Sweden May 28, 1947

13 Claims. (Cl. 332—23)

The present invention relates to frequency modulated transmitters and particularly to devices for modulation of such transmitters. It works so far according to the same principles as frequency modulated transmitters provided with a common reactance tube, as an oscillating circuit in the transmitter is fed with a current, which is 90° out of phase in relation to the voltage across the circuit. Compared with transmitters with reactance tubes this transmitter has the following advantages:

A frequency which is great enough to work the transmitter can be obtained without the use of special frequency multipliers.

The frequency deviation can be made independent of the variations in feeding voltages, ageing phenomenas in tubes and the like.

For D. C. modulation current signalling the signal voltage terminals may be separated galvanically from the feeding voltages of the transmitter, earth and so on.

The symmetry of the frequency deviation is easily adjustable.

The transmitter is especially applicable to frequency modulated carrier frequency telegraphy, but is also very suitable for telephony.

A device according to the invention contains an oscillator, the frequency of which is varied in dependence on a signal voltage a modulator connected not only to the oscillator, from which it obtains a voltage with the oscillating frequency of the oscillator, but to a device delivering the signal voltage by which the transmitter is to be modulated, this device being so arranged, that in its output circuit a voltage is obtained with oscillator frequency, the amplitude of which is proportional to the amplitude of the signal voltage and which changes phase 180°, when the signal voltage goes through zero, a phase shifting device, the input circuit of which is connected to the output circuit of the modulator and the output circuit of which is directly or indirectly connected to the oscillating circuit of the oscillator, delivering a current to said oscillating circuit, which is 90° out of phase in relation to the feed back current in the oscillator.

The invention will be clearly understood from the following detailed description with reference to the accompanying drawings in which.

Figure 5:
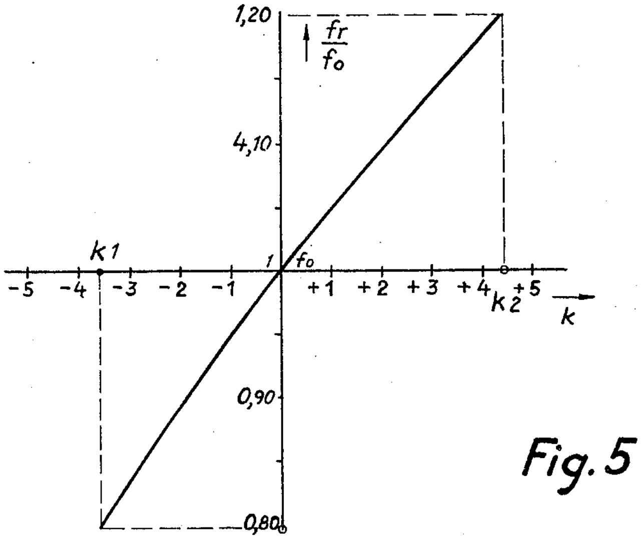
Figure 6:
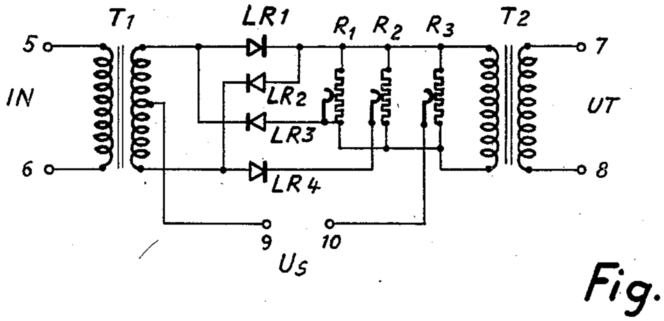
Figure 7:
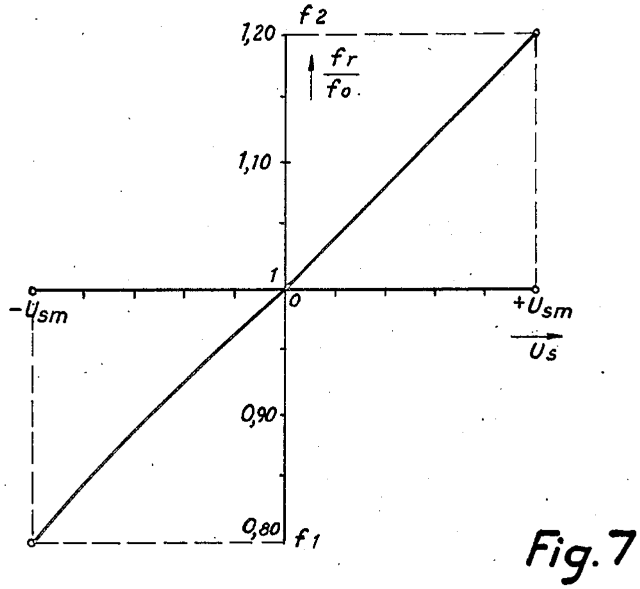

Fig. 5 an example of the frequency deviation obtained in the transmitter;

Fig. 6 a schematic circuit diagram of a modulator;

Fig. 7 a diagram for the relative frequency deviation for different modulation voltages;

Figs. 8–11 circuit diagrams showing different examples of modulations; and

Figure 11:
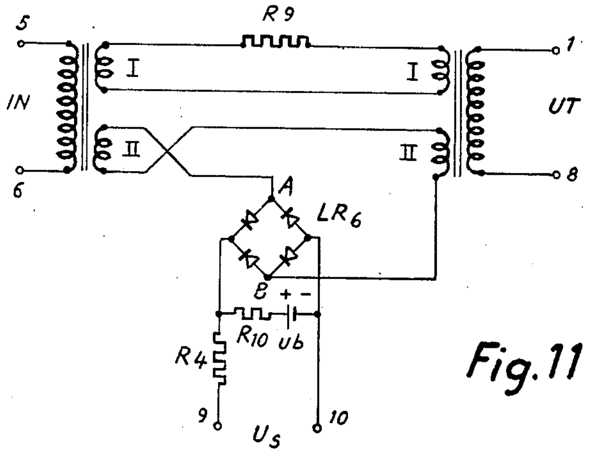
Figure 12:
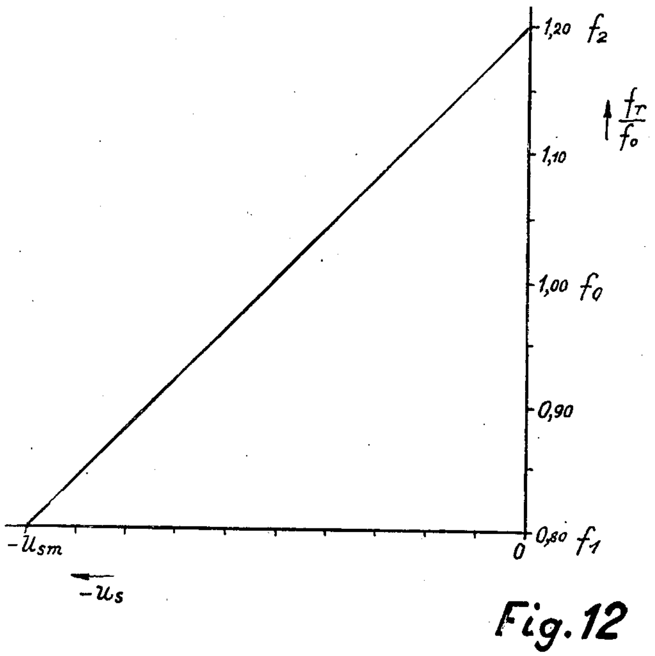

Fig. 12 a diagram of frequency deviation as modulating signal voltage for an arrangement according to Fig. 11, a preferred embodiment for D. C. current modulation operation.

Figures 1, 2:
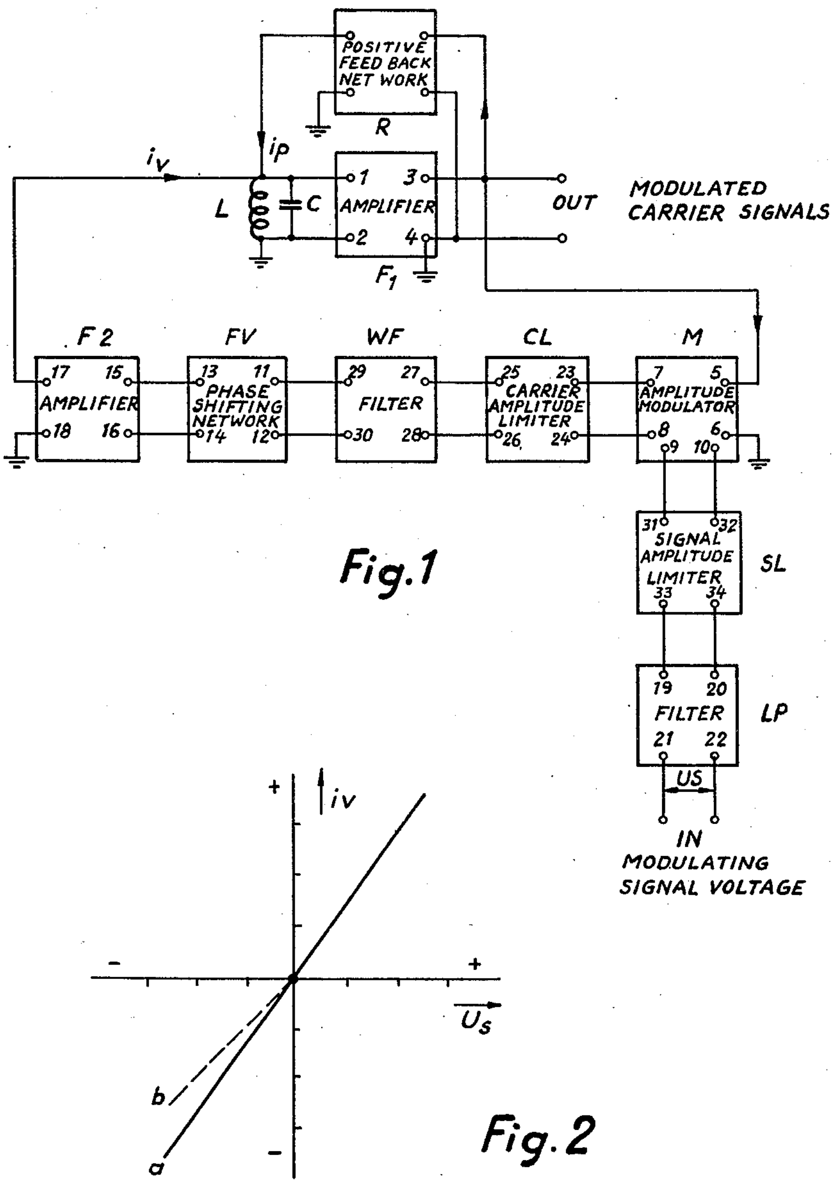
Fig. 1 is a schematic block diagram illustrating a transmitter according to the invention.
Fig. 2 is a diagram for current as modulation voltage.

The device is represented schematically in Fig. 1. The transmitter consists of the amplifier F1, to the input terminals 1 and 2 of which an oscillating circuit is connected, consisting of an inductance coil L and a condenser C. Positive feed back is arranged from the output terminals 3 and 4, in the shown circuit symbolized by the network R connected between terminals 3 and 4 and the circuit LC to such a degree that the system will oscillate.

From the output terminals or from some other suitable point in the amplifier F1 an alternating voltage is connected to a balanced amplitude modulator M (terminal 5 and 6). The modulator receives a control voltage, impressed across the terminals 9, 10, from a low pass filter LP, which limits the signal frequency band with output terminals 19, 20 and input terminals 21, 22 (In), to which the modulating signal voltage $U_s$ is fed. A signal amplitude limiter SL may be inserted between 19, 20 of LP and 9, 10 of M, connected by means of its input terminals 33, 34 and output terminals 31, 32.

At the output terminals 7 and 8 of the modulator M a voltage of the oscillator frequency appears, the amplitude of which is proportional to the amplitude of the signal voltage and is changing phase 180°, when the signal voltage passes zero.

In the following phase shifting network FV the phase angle of the voltage is shifted so that the current $i_v$ to the oscillating circuit LC from a suitable amplifier F2 between the phase shifter and the oscillating circuit is 90° out of phase to the feed back current $i_p$ from the amplifier F1. The current $i_v$ is directly proportional to the magnitude of the signal voltage, is zero for the signal voltage zero (due to the balance of M) and changes direction simultaneously with the signal voltage (Fig. 2).

When the current $i_v$ is 90° before $i_p$ the frequency of the transmitter will increase. The frequency will decrease, when $i_v$ is 90° after $i_p$ in phase.

Figure 3:
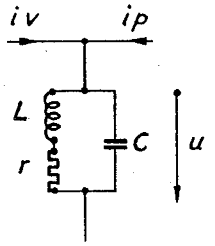
Fig. 3 is a schematic diagram illustrating the influence of feed back and modulation currents on the oscillating circuit of the transmitter.

In Fig. 3 this is illustrated more closely. The oscillating circuit consists of the inductance L with a loss resistance $r=d\omega L$, where $d$ is the loss factor and $\omega=2\pi f$ is the angular velocity, and the parallel capacitance C, which is supposed to be without loss. The impedance of the oscillating circuit is $Z=R+jX$, where R is the resistance, X the reactance and $$j=\sqrt{-1}$$

The voltage across the circuit is $$U=(i_p+i_v)\ (R+jX) \quad (1)$$

If $$\frac{i_v}{i_p}=jk \quad (2)$$

one obtains out of the oscillation condition that the phase angle between U and $i_p$ must be zero and $$k=-\frac{X}{R}$$

or $$\frac{i_v}{i_p}=-tg\phi \quad (3)$$

supposing that the impedance in the direction of the terminals 17 and 18 of the amplifier $F_2$ and over the feed back channel of the transmitter amplifier $F_1$ is great in relation to the impedance of the oscillating circuit LC.

Figure 4:
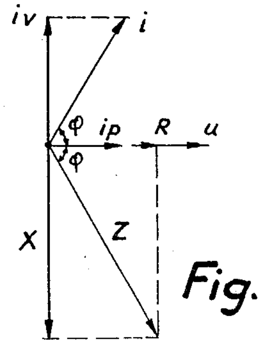
Fig. 4 is a vector diagram for this circuit.

This is shown in the vector diagram of Fig. 4, where $k$ is supposed to be positive. For opposite polarity of the modulating signal voltage $k$ obtains negative values.

From this the frequency conditions for the oscillating circuit can be calculated to $$\frac{f_r}{f_o}=\sqrt{1+kd} \quad (4)$$

where $fr$ is the actual frequency of the transmitter for the value of $i_v$ corresponding to the value $k$ and $fo$ is the frequency when $i_v=0$.

Fig. 5 shows an example of the frequency deviation $$\frac{f_r}{f_o}$$

as a function of $k$. The maximum deviation towards the higher frequency $f_2$ has been supposed to be $$\frac{f_r}{f_o}=1.20$$

which corresponds to $k=k_2=4.4$. For the lower frequency $f_1$ $$\left(\frac{f_r}{f_o}=0.8\right)$$

on the contrary $k=k_1=3.6$, thus lower than $k_2$.

At great frequency deviations the modulator M should therefore be provided with means by which the current $i_v$ may be regulated to different values for positive or negative half-periods of the signal voltage $U_s$ independent of each other. In Fig. 2 this is symbolized by a line $b$, which indicates $-i_v$ as a function of $-U_s$ and which has another slope than the line corresponding to $+i_v$ as a function of $+U_s$.

An example of a suitable modulator circuit is shown in Fig. 6. The indications correspond to those of Fig. 1. The input voltage from the oscillator is impressed upon the modulator by means of a transformer T1. The output voltage to the phase shifter FV is obtained from a transformer T2. The modulating signal voltage $U_s$ is applied between the middle point of the secondary winding of the transformer T1 and the sliding contact of a potentiometer R3.

For a signal voltage $U_s$ of such polarity that the terminal 9 is positive relative the terminal 10 rectifiers LR1 and LR4 obtain a low resistance for passing oscillator voltage whereas rectifiers LR2 and LR3 receive back voltage with a very high resistance. The resistances of the rectifiers LR1 and LR4 and consequently the current caused by oscillator voltage is dependent on the absolute value of the signal voltage. With a potentiometer R2 the value of the oscillator voltage in the modulator may be adjusted. With a potentiometer R3 the modulator is balanced so that influence from the signal voltage $U_s$ is neutralized across the terminals 7 and 8.

With opposite polarity of $U_s$ (terminal 9 negative in relation to terminal 10) the rectifiers LR2 and LR3 obtain a low resistance whilst voltage then passes the modulator with a phase shift of 180° compared with the above mentioned case. The output voltage is regulated with a potentiometer R1.

With the potentiometers R2 and R1 the control currents caused by the positive and by the negative half-periods of $U_s$ may thus be adjusted independently and the maximum frequency deviation of the transmitter be regulated. In this way a symmetrical deviation is obtained as a function of the signal voltage value according to Fig. 7, which shows $$\frac{f_r}{f_o}$$

as $U_s$ up to the maximum value $U_{sm}$ and $-U_{sm}$. The modulator may also be used for D. C. control currents.

When using the transmitter for telegraph code transmission the modulation is often controlled with single current, i. e. current or no current condition. The modulator according to Fig. 6 can be used for this purpose by connecting a voltage opposing the signal voltage between the terminals 9 and 10. The control voltage zero (spacing) may for instance give the frequency $f_2$ and full negative signalling voltage marking the frequency $f_1$.

Figure 8:
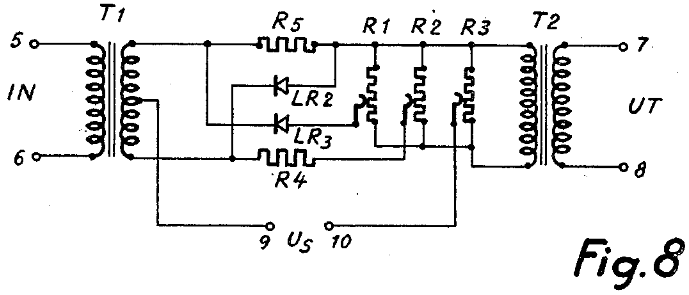

Fig. 8 shows another circuit according to the invention. The resistances $R_4$ and $R_5$ which substitute the rectifiers $LR_1$ and $LR_4$ according to Fig. 6 are so dimensioned that an oscillator voltage giving the frequency $f_2$ will pass the modulator when the control voltage $U_s$ is zero. For a signal current corresponding to the control voltage $U_{sm}$ the lower frequency $f_1$ is obtained.

The circuits given in Figs. 6 and 8 are only examples of preferred embodiments of the invention.

The phase shifter FV of Fig. 1 may be of a known, suitable type.

It is important that the impedance of terminals 17 and 18 of the amplifier F2 of Fig. 2 is great in relation to the impedance of the oscillating circuit LC. The amplifier F2 may therefore be operated with negative current feed-back from the anode circuit of the output tube to the input side of the amplifier. This gives the further advantage that for a sufficient negative feed back the amplification will be independent of variations in supply voltages and ageing of the tubes. The amplifier may be provided with a potentiometer for setting of the current $i_v$ to a desired frequency deviation.

For the same reason, as mentioned before, the resistance of the positive feed back path should also be as high as possible. Also the amplifier F1 may therefore be provided with negative feedback which furthermore contributes to an increased frequency stability.

As mentioned above the low pass filter LP of Fig. 1 produces a limitation of the voice frequency band. This filter may suitably be performed so that the higher signal frequencies are emphasized, which in certain cases may be of importance in order to obtain freedom from interferences.

In certain cases a filter network WF between the modulator M and the phase shifter FV may be of advantage. It may conceivably be operated as a frequency independent network.

An amplitude limiter may be connected to the IN-terminals of the oscillating amplifier for preventing overmodulation. An amplitude limiter CL after the modulator at the terminals 7 and 8 fills the same purpose.

Figure 9:
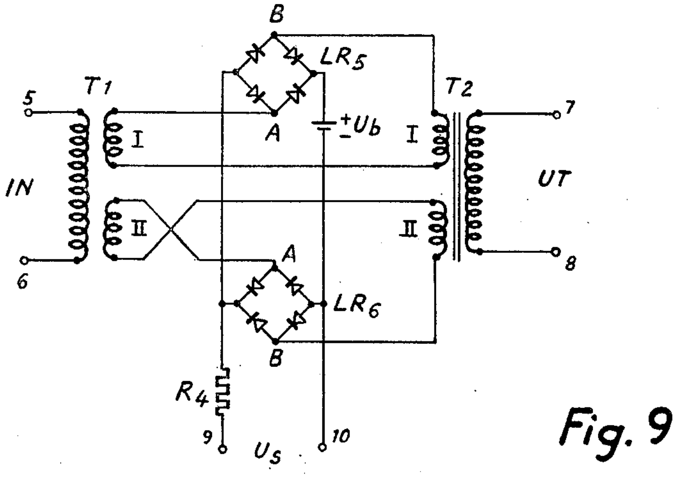

Fig. 9 shows another embodiment of the modulator. When no signal is impressed on the signal input terminals of the modulator the impedances between the points A and B in the rectifier bridges LR5 and LR6 are great and almost equal. The bridge is balanced and no oscillator voltage or at least a very inconsiderable one is passing the modulator. When terminal 9 is positive in relation to terminal 10 the rectifier LR5 has a low resistance between the points A and B which depends on the value of the signal voltage $U_s$. The rectifier LR6 receives back voltage and gets a very high resistance between the points A and B. The oscillator voltage passes the windings I in the differential transformers T1 and T2. For negative voltage on the terminal 9 the rectifier LR6 has a low resistance between the points A and B, whereas the resistance of the rectifier LR5 is very high between corresponding points. A voltage with oscillator frequency and a phase shift of 180° is thus obtained from the output terminals 7 and 8 through the windings II of the transformers. A resistance $R_4$ is inserted in the signal voltage connection wire for regulation purposes.

Figure 10:
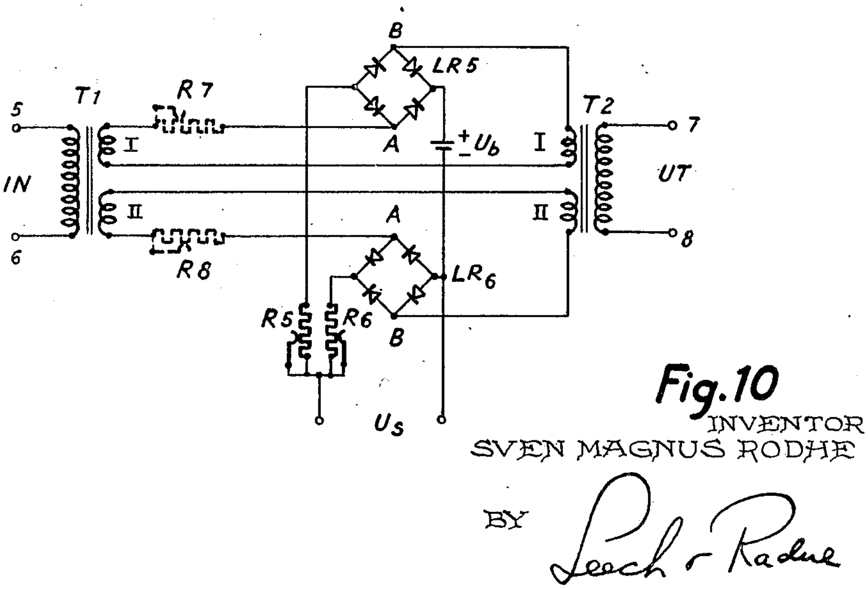

Individual regulation of the oscillator voltage passing the modulator for the two half-periods of the signal voltage may be obtained by dividing the connection wires from the signal voltage input terminals into two paths according to Fig. 10 containing regulation resistances $R_5$ and $R_6$, respectively. A further possibility is to insert adjustable resistances $R_7$ and $R_8$ in the two current paths over the windings I and the windings II, respectively, in the transformers T1 and T2.

In the Figures 9 and 10 is also shown how certain noise disturbances may be eliminated. If the signal line connected to the transmitter is exposed to disturbances it may be suitable to connect a voltage $U_b$ to the two rectifiers with such a polarity, that a certain threshold voltage of the signal is necessary, before the frequency deviation begins.

In Fig. 11 the rectifier LR5 is substituted by a resistance R9. By adapting this resistance a characteristic according to Fig. 12 is obtained. For the signal voltage zero the oscillator voltage passes the windings I of the transformers to the output terminals and gives rise to a frequency $f_2$ from the transmitter. For an increased negative signal voltage on the terminal 9 a current is obtained through the windings II in the transformers. At a certain signal voltage balance is prevailing in the modulator, for which the frequency $f_0$ is obtained from the transmitter. At full signal voltage the current through the windings II overweighs and the frequency $f_1$ is transmitted. By choosing different values on the resistance R9 different frequency characteristics may be obtained. The rectifier may as before be given a certain threshold back boltage in order to eliminate disturbances. The voltage source $U_b$ is connected in series with a resistance $R_{10}$.

Elimination of disturbances can also be obtained by giving the amplifier F2 a certain threshold value, which the voltage from the oscillator has to surpass before current ($i_v$) is obtained between the amplifier and the oscillating circuit.

I claim:

1. A wave-signalling system for modulating the frequency of a carrier wave in dependence on a signal, comprising a carrier wave oscillator, said oscillator including an amplifier, a resonant circuit coupled to the input side of said amplifier, two separate feedback channels extending from the output side of said amplifier to said resonant circuit, one of said channels having a positive feedback network for maintaining the oscillations of said carrier wave oscillator, said positive feedback channel being constructed to feed a carrier current into said resonant circuit substantially in phase with the carrier voltage across the resonant circuit, the second feedback channel including an amplitude modulator constructed and arranged to be excited by a modulating signal voltage in such a way that the carrier current at the output of said second feedback channel is proportional to the instant value of the signal voltage, said modulator being arranged to cause said carrier current to reverse its phase 180° for a certain magnitude and/or polarity of the signal voltage, said second feedback channel containing a phase shifting network in series with said amplitude modulator for feeding into said resonant circuit a second carrier current phase displaced substantially ninety degrees relative to the current fed into the resonant circuit from said positive feedback channel, the combination of said two carrier currents fed into said resonant circuit resulting in a displacement of the carrier wave frequency in accordance with the instant value of said modulating signal voltage.

2. A system according to claim 1 wherein said second feedback channel includes an amplifier connected to said resonant circuit.

3. A system according to claim 1 wherein said amplitude modulator in said second feedback channel is provided with means for independently adjusting the magnitude of the carrier current output from said channel for positive and for negative polarities of the modulating signal voltage.

4. A system according to claim 1 wherein said amplitude modulator in said second feedback channel has two parallel carrier channels, at least partly separated one from the other with the branches of one of said carrier channels shifted in relation to the other one to produce a mutual phase displacement of 180° between them on the output sides of the carrier channels, each of said carrier channels containing rectifier devices connected to be actuated by the modulating signal voltage in such a way, that for one polarity of said signal voltage one of said carrier channels becomes conductive for carrier current in a degree dependent on the magnitude of said signal voltage and the second of said carrier channels becomes substantially blocked, and that for opposite polarity of said signal voltage the second of said carrier channels becomes conductive and the first of said carrier channels is blocked.

5. A system according to claim 1 wherein said amplitude modulator in said second feedback channel has two parallel carrier channels, at least partly separated one from the other, the branches of one of said carrier channels shifted in relation to the other one to produce a mutual phase displacement of 180° between them on the output sides of the carrier channels, one of said carrier channels including a fixed network, the second of said carrier channels containing a rectifier device connected to be actuated by the modulating signal voltage in such a way, that for a certain polarity of said signal voltage said second carrier channel becomes conductive for carrier current in a degree dependent on the magnitude of said signal voltage, and that for opposite polarity of said signal voltage said second carrier channel becomes substantially blocked.

6. A system according to claim 1 wherein to said amplitude modulator in said second feedback channel a voltage source is connected, giving said modulator a predetermined threshold for the modulating signal voltage, below which the modulator is not excited.

7. A system according to claim 1 for telegraphic transmission, wherein to said amplitude modulator in said second feedback channel a fixed voltage source is connected in series with the modulating signal source.

8. A system according to claim 1 wherein between said amplitude modulator in said second feedback channel and the modulating signal source a wave filter is connected for the modulating signal frequencies.

9. A system according to claim 1 wherein between said amplitude modulator in said second feedback channel and the modulating signal source a frequency depending network is connected for the modulating signals.

10. A system according to claim 1 wherein said second feedback channel includes a wave filter for the carrier current.

11. A system according to claim 1 wherein said second feedback channel includes a frequency depending network for the carrier current.

12. A system according to claim 1 wherein said second feedback channel includes a limiter for the carrier amplitudes.

13. A system according to claim 1 wherein between said amplitude modulator in said second feedback channel and the modulating signal source a limiter is connected for the modulating signal amplitudes.

SVEN MAGNUS RODHE.

REFERENCES CITED

The following references are of record in the file of this patent:

UNITED STATES PATENTS

| Number | Name | Date |
|---|---|---|
| 2,136,606 | Bendel | Nov. 15, 1938 |
| 2,152,016 | Baesecke et al. | Mar. 28, 1939 |
| 2,448,558 | Stodola | Sept. 7, 1948 |
| 2,458,574 | Dow | Jan. 11, 1949 |